(12) United States Patent
Gilder

(10) Patent No.: US 11,519,449 B2
(45) Date of Patent: Dec. 6, 2022

(54) BOLT-COVERING CAP

(71) Applicant: David Gilder, Yazoo City, MS (US)

(72) Inventor: David Gilder, Yazoo City, MS (US)

( * ) Notice: Subject to any disclaimer, the term of this patent is extended or adjusted under 35 U.S.C. 154(b) by 444 days.

(21) Appl. No.: 16/834,906

(22) Filed: Mar. 30, 2020

(65) Prior Publication Data
US 2021/0301859 A1 Sep. 30, 2021

(51) Int. Cl.
*F16B 37/14* (2006.01)
*E03D 11/16* (2006.01)

(52) U.S. Cl.
CPC ............. *F16B 37/14* (2013.01); *E03D 11/16* (2013.01)

(58) Field of Classification Search
CPC ........ F16B 33/006; F16B 37/14; E03D 11/16; Y10S 411/91
USPC .......... 411/372.5, 372.6, 373, 374, 429, 430, 411/431
See application file for complete search history.

(56) References Cited

U.S. PATENT DOCUMENTS

| | | | | |
|---|---|---|---|---|
| 1,994,978 A * | 3/1935 | Brown | ................... | A47G 3/00 411/374 |
| 2,551,834 A | 5/1951 | Ferguson | | |
| 2,819,642 A * | 1/1958 | Refrigeri | .................. | F16B 37/14 411/373 |
| 3,241,427 A * | 3/1966 | Bosler | ..................... | F16B 37/14 411/374 |
| 3,362,280 A | 1/1968 | Muller | | |
| 4,558,494 A | 12/1985 | Kraus | | |
| 5,082,409 A * | 1/1992 | Bias | ....................... | F16B 37/14 411/372.5 |
| 5,098,242 A | 3/1992 | Schaty | | |
| 5,857,818 A * | 1/1999 | Bias, Sr. | ................. | F16B 37/14 411/429 |
| 6,238,158 B1 * | 5/2001 | Clements | ................ | F16B 37/14 411/372.6 |
| 7,029,221 B2 | 4/2006 | Kovac | | |
| 8,920,090 B2 | 12/2014 | Reimchen | | |
| 9,033,633 B2 * | 5/2015 | Henry | ...................... | A47G 3/00 411/429 |
| 9,631,666 B1 | 4/2017 | Colford | | |
| 2002/0192052 A1 * | 12/2002 | Ruspa | ..................... | F16B 37/14 411/431 |
| 2013/0170923 A1 * | 7/2013 | Kuhm | ..................... | F16B 37/08 411/511 |
| 2014/0294533 A1 * | 10/2014 | Henry | ..................... | F16B 37/14 411/374 |

* cited by examiner

*Primary Examiner* — Roberta S Delisle
(74) *Attorney, Agent, or Firm* — Keaty Law Firm LLC

(57) ABSTRACT

A bolt-covering cap which is self-threading and gives little resistance when being threaded onto a bolt but greater resistance when being unthreaded, providing for easy installation, a tight and secure fit resistant to inadvertent loosening, and intentional removal when needed. The bolt-covering cap provides a cover shell and three angled blades which slightly deflect in one direction, requiring less turning force, and which resist deflection in the opposite direction, requiring more turning force and resisting inadvertent loosening.

19 Claims, 7 Drawing Sheets

BOLT-COVERING CAP

BACKGROUND OF THE INVENTION

This invention provides a bolt-covering cap.

The installation of toilets is an instance where the use of bolts is necessary, but where the exposed ends of the bolts are dangerous and unsightly. The flange bolts used in installing toilets need to be long enough to accommodate thicker flooring materials, but leave excess exposed bolt when used with less thick flooring. The bolt caps or covers presently known are difficult to install, are vulnerable to being knocked or shaken loose during use and cleaning of the toilet, are hard to clean, and tend to provide places for dirt and grime to accumulate, especially when incorrectly installed or knocked out of position.

What is needed is a bolt-covering cap which is self-threading and gives little resistance when being threaded onto a bolt but greater resistance when being unthreaded, providing for easy installation, a tight and secure fit resistant to inadvertent loosening, and intentional removal when needed.

U.S. Pat. No. 2,551,834 for a "Protective Plastic Cap," issued on May 8, 1951 to assignee The Presstite Engineering Company, provides for a plastic cap for protecting vulnerable machine parts and the like.

U.S. Pat. No. 9,631,666 for a "Plastic Expandable Bolt Thread Protector," issued on Apr. 25, 2017 to inventor Duane Colford, provides for a plastic expandable bolt thread protector that protects the threads of a bolt over which the thread protector is placed either just before shipping a bolt or just before a bolt is put to use. The thread protector is made of a rigid but flexible material having inwardly extending protrusions or pointed segments extending from the wall of the protector into a hollow interior of the protector and when the protector is axially placed over the bolt threads the protrusions or pointed segments create an interference fit with the bolt threads that holds the protector on the bolt threads, and when there is a greater interference fit the wall of the protector deforms and expands outwardly.

U.S. Pat. No. 7,029,221 for a "Sleeve Device with Internal Fins for Holding a Piece Such as a Bolt in a Bore," issued on Apr. 18, 2006 to assignee Newfrey LLC, provides for a device for holding a piece in a bore, comprising a cylindrical sleeve constructed to be inserted into the bore and held therein by engagement of its outer surface with an inner surface of the bore, and a series of fins extending longitudinally of an inner surface of the sleeve and projecting inwardly from the inner surface of the sleeve, the fins being spaced from each other circumferentially of the sleeve with tips disposed to engage an outer surface of a piece inserted into the sleeve. The sleeve and the fins are integrally formed of resilient flexible plastic, and the fins are skewed in a same circumferential direction relative to radial planes of the sleeve. The flexibility of the fins is such that the fins can be readily deflected when engaged by an inserted piece.

U.S. Pat. No. 8,920,090 for a "Captive Securing Means for a Screw," issued on Dec. 30, 2014 to assignee Phoenix Contact GmbH & Co. KG, provides for a captive securing means for a screw has a shaft for holding the screw and a retaining means arranged in the shaft, the retaining means resting, in the inserted state of the screw, at a tangential point on the outer circumferential surface of the screw, the retaining means arranged on the inner circumferential surface of the shaft, and the retaining means extending from the inner circumferential surface of the shaft into the free region of the shaft such that at the tangential point, the angle between the direction of extent of the retaining means and the outer circumferential surface of the screw is <90 degrees. Consequently, the screw is axially moveable in the shaft without the quality of the captive securing means being impaired, and the screw is captively secured in the shaft by the retaining means resting on the outer circumferential surface of the screw.

U.S. Pat. No. 4,558,494 for a "Plastic Fastening Component," issued on Dec. 17, 1985 to assignee TRW United-Carr GmbH, provides for a plastic component having a cylindrical connecting portion with a contoured interior space designed for acceptance of a threaded or profiled bolt or stud. The interior space is designed with resilient gripping members which are attached at one end to the walls of the interior space and protrude obliquely into the interior space. The members are designed to firmly grip the stud or bolt without undergoing permanent deformation or deforming the cylindrical connecting portion.

U.S. Pat. No. 3,362,280 for a "Push-On Molded Plastic Cap-Fastener," issued on Jan. 9, 1968 to assignee Russell, Burdsall, & Ward Bolt and Nut Company, provides for a push-on molded plastic cap fastener for pushing over the end of a protruding stud, such as a nail, having a cylindrical hollow socket chamber closed at its outer end and open at its inner end and an annular flange extending outwardly from the open inner end of the socket chamber; the socket chamber having inwardly extending wings which grip the shank of the protruding stud when it is inserted into the socket chamber.

U.S. Pat. No. 5,098,242 for a "Plastic Fastener for Threaded Stud," issued on Mar. 24, 1992 to assignee Emhart, Inc., provides for a plastic hex shaped tubular fastener which is to be secured to a threaded stud. A plurality of spaced flexible tongues which project radially inwardly near the bottom of the body locate within the screw of the stud when pushed on the stud and when so located projecting cams carried on vertical ribs spaced from the tongues locate within the screw thread so that the fastener can then be screwed tight.

U.S. Pat. No. 3,241,427 for a "Bolt Cap Unit," issued on Mar. 22, 1966 to assignee Borg-Warner Corporation, provides for a bolt cap unit and more particularly to a unit having a cap covering a bolt utilized in securing toilet fixtures.

SUMMARY OF THE INVENTION

This invention provides a bolt-covering cap which is self-threading and gives little resistance when being threaded onto a bolt but greater resistance when being unthreaded, providing for easy installation, a tight and secure fit resistant to inadvertent loosening, and intentional removal when needed.

The bolt-covering cap provides a cover shell and three angled blades which slightly deflect in one direction, requiring less turning force, and which resist deflection in the opposite direction, requiring more turning force and resisting inadvertent loosening.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
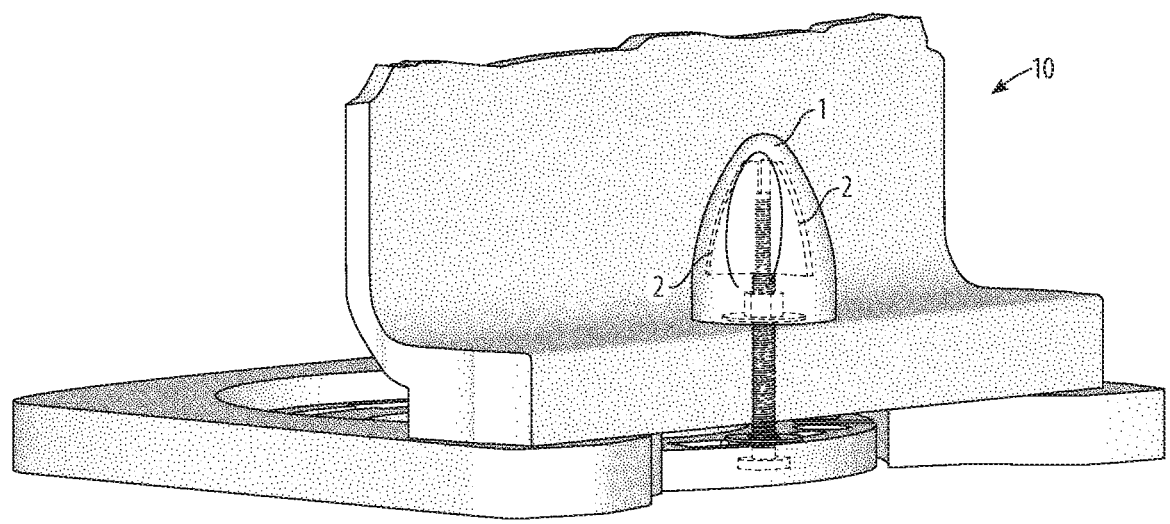
FIG. 1 is a perspective hidden-line view of a toilet-mounting embodiment of the bolt-covering cap of the invention in use.
Figure 2:
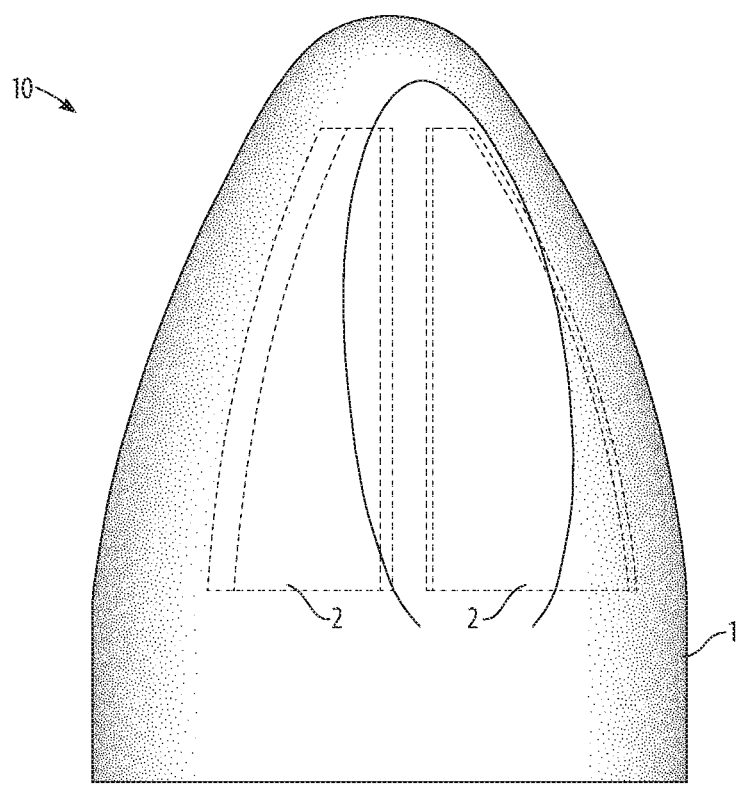
FIG. 2 is a side hidden-line view of a toilet-mounting embodiment of the bolt-covering cap of the invention.
Figure 3:
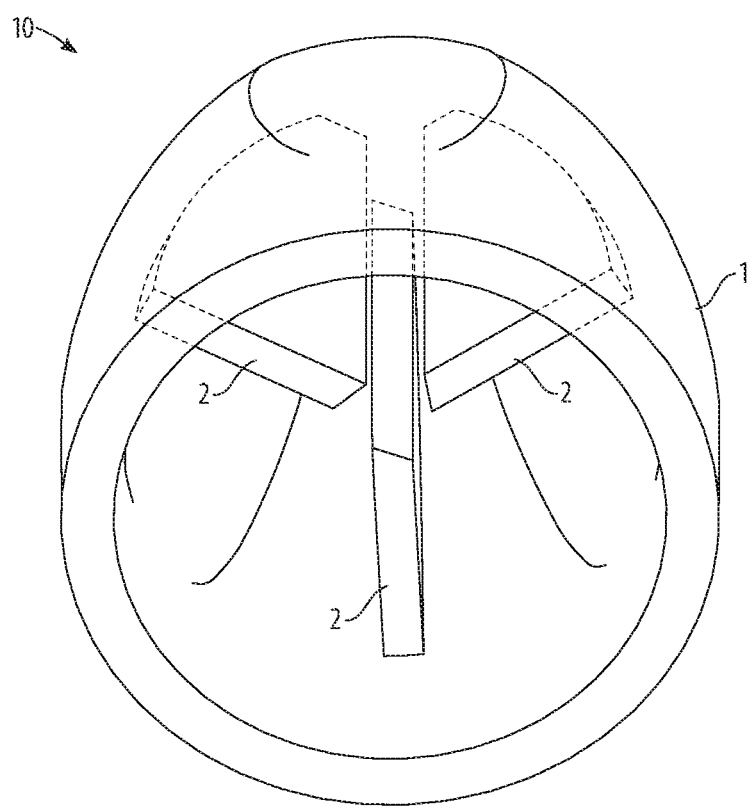
FIG. 3 is an underside hidden-line view of a toilet-mounting embodiment of the bolt-covering cap of the invention.
Figure 4:
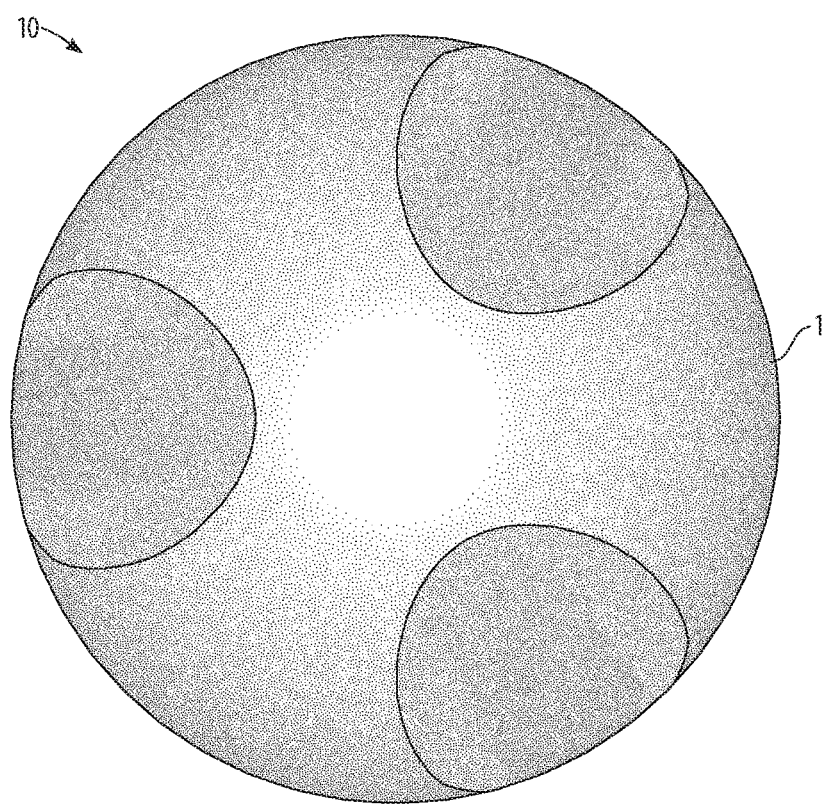
FIG. 4 is a top view of a toilet-mounting embodiment of the bolt-covering cap of the invention.
Figure 5:
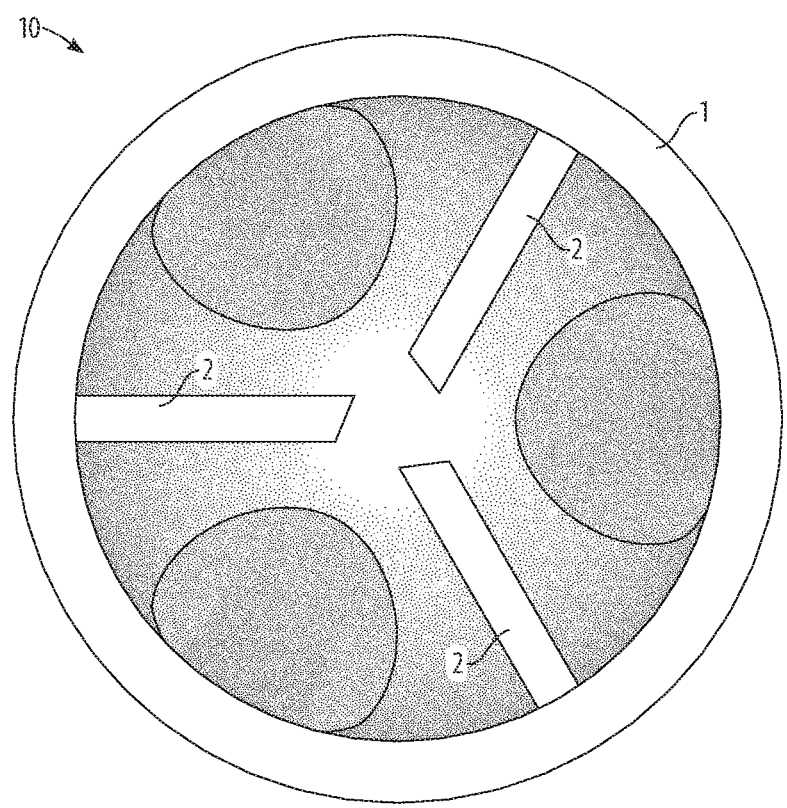
FIG. 5 is a bottom view of a toilet-mounting embodiment of the bolt-covering cap of the invention.

Referring to FIG. 1, the bolt-covering cap 10 covers the threads of a bolt and gives little resistance when being threaded onto a bolt but greater resistance when being unthreaded from the bolt, so that installation is made easy but the bolt-covering cap 10 is resistant to being loosened unintentionally, yet can be loosened when needed. The bolt-covering cap 10 conforms to and engages with the threads of the bolt to an extent sufficient to prevent any unintentional slipping or pulling off of the cap. In a toilet-mounting embodiment as shown, the bolt-covering cap 10 covers the exposed end of the flange bolts which secure the toilet to the toilet flange. The toilet-mounting embodiment provides solutions to many of the problems encountered in the installation and long-term upkeep of an installed toilet, including adaptation to varying lengths of exposed bolt, easy self-threading installation, and resistance to unintentional loosening during use and cleaning. This embodiment provides easier installation, upkeep, and replacement by non-plumbers.

Parts of the bolt-covering cap 10 are sized and placed in relation to a bolt of a particular size and type. A bolt is considered to be distinct from a screw in that the bolt has finer and shallower threads and has a consistent diameter and circumference throughout, exclusive of the bolt head, along an axis. The bolt diameter is considered to be the original diameter before threading, which is the larger diameter of the finished bolt. A bolt has a thread-handedness, which is either a right-hand or clockwise threading or a left-hand or counterclockwise threading. The majority of bolts have a right-hand or clockwise thread-handedness, which is illustrated in the drawings. Turning a nut or a cap on a bolt along the thread-handedness, such as right-hand turning on a right-hand bolt, tends to pull the bolt into the nut or cap. Turning a nut or a cap on a bolt opposite the thread-handedness, such as left-hand turning on a right-hand bolt, tends to push the bolt out of the nut or cap.

Figure 8:
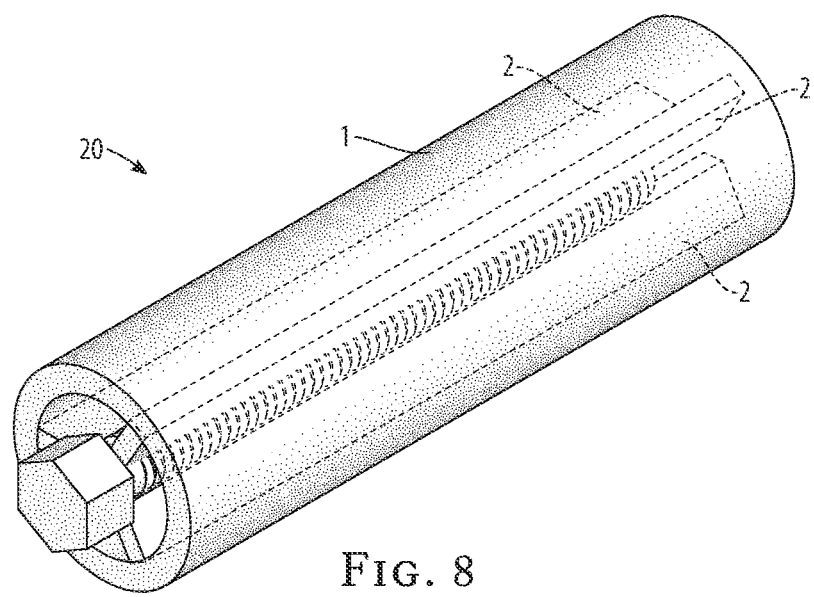
FIG. 8 is a perspective hidden-line view of a bolt-protecting embodiment of the bolt-covering cap of the invention.

Referring briefly to FIG. 8, a bolt-protecting embodiment 20 of the bolt-covering cap is also provided. This embodiment is appropriate for protection of the threads of a bolt and protection of other objects from being damaged by the threads of a bolt.

Referring to FIGS. 2-5, the bolt-covering cap 10 provides a cover shell 1 and three angled blades 2, as shown. The cover shell 1 of the toilet-mounting embodiment provides indentations or fluting to provide for a better grip when installing or removing, without creating any sharp angles or recesses prone to trapping dirt. The open portion of the cover shell 1 of the toilet-mounting embodiment has an interior diameter sufficient to accommodate a variety of flange-bolt nuts. An interior diameter of approximately 1.25 inches or 32 mm is appropriate. A wall thickness of approximately 0.125 inches or 3 mm is appropriate, resulting in an outside diameter of approximately 1.5 inches or 39 mm at the opening. The cover shell 1 can taper inward toward the top, as shown, while avoiding sharp angles, in order to improve the grip during installation and removal.

The cover shell 1 defines an interior chamber. For proper operation, the diameter of the interior chamber should be at least double the bolt diameter, to allow the angled blades 2 to be of a sufficient width to provide for deflection, as treated below. The diameter of the interior chamber can be larger, or can be varied, in order to provide for other considerations, such as with the toilet-mounting embodiment treated above. The length of the cover shell 1 and interior chamber can be varied. For the toilet-mounting embodiment, a length of approximately 2 inches or 50 mm is appropriate to accommodate the variations in the length of exposed bolt for installations on various depths of floor surfaces.

Three angled blades 2 are mounted within the interior chamber of the cover shell 1, as shown. The blades are oriented parallel to the central axis of the interior chamber of the cover shell 1, which corresponds to the central axis of the bolt. The three angled blades 2 are mounted in a radial pattern at 120-degree spacing, as shown. Each angled blade 2 extends from the cover shell 1 toward the central axis of the interior chamber, as shown. The three angled blades 2 define a central axial void along the central axis of the interior chamber. The central axial void is meant to accommodate a bolt. Each angled blade 2 has an angled face closest to the central axis, as shown. The angled face has two edges where it meets the side faces on either side. The leading edge is considered to be the first edge that an arbitrary point along the circumference of the bolt would pass when turning along the thread-handedness, and the trailing edge is the second edge. Therefore, the angle between the angled face and the side face at the leading edge will be obtuse and at the trailing edge acute. Therefore, the leading edge will be at a greater distance from the central axis than the trailing edge will be. Each of the three angled blades 2 extends toward the central axis such that the middle portion of the face, midway between the leading and trailing edges, is in a position matching the bolt diameter, as shown. Therefore, when a bolt is placed into the central axial void along the central axis, the leading edges of the angled blades 2 will not make contact with the bolt diameter, and the trailing edges will be pressed against the bolt diameter.

In the toilet-mounting embodiment, the angled blades 2 are placed far enough away from the opening of the cover shell 1 to allow space to accommodate a variety of flange-bolt nuts, as shown. A placement of approximately one-half inch is appropriate.

The cover shell 1 and the angled blades 2 can be made from the same or from different materials. A plastic, such as PVC or HDPE, with moderate stiffness, is appropriate. The angled blades 2 can be formed simultaneously with the cover shell 1, in a process such as injection molding, or can be formed separately and fixed into the cover shell 1.

Figure 6:
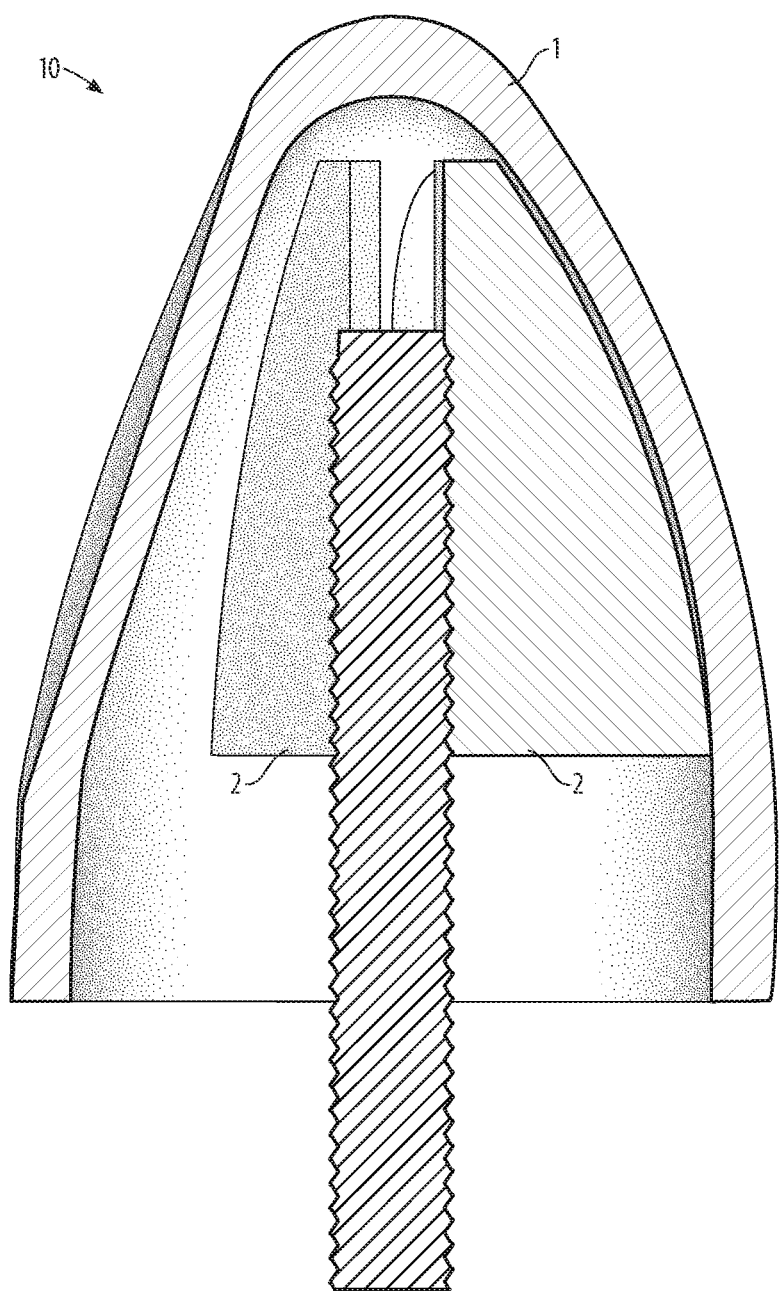
FIG. 6 is a side sectional view of a toilet-mounting embodiment of the bolt-covering cap of the invention in use on a bolt.
Figure 7:
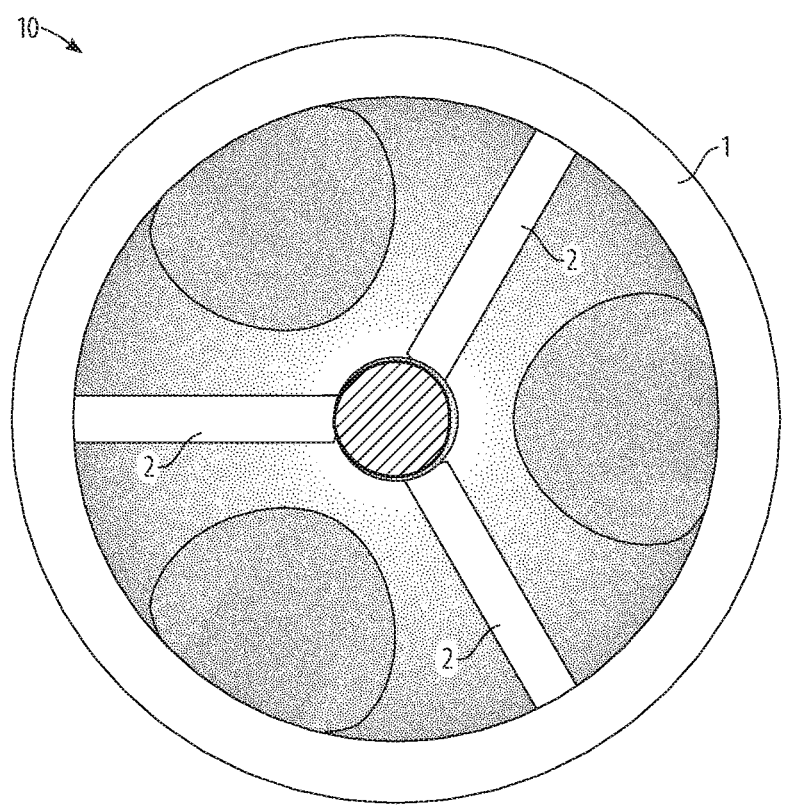
FIG. 7 is a bottom view of a toilet-mounting embodiment of the bolt-covering cap of the invention in use on a bolt.

Referring to FIG. 6 and FIG. 7, in use, the bolt-covering cap 10 is placed upon a bolt and is turned according to the thread-handedness of the bolt, which is usually a right-hand or clockwise turning. The angled blades 2 will become slightly deformed by frictional contact between the bolt and a portion of the angled faces, and this deformation will place the angled faces in an orientation more tangential, but not fully tangential, to the bolt. As a consequence of the allowed deformation and the more-tangential orientation, the bolt-covering cap 10 will be relatively easily turned with relatively smaller force. At the trailing edges, the bolt will deform the angled blades 2 by cutting into them in a thread pattern corresponding to the bolt, with the result of forming, in effect, a self-threaded nut securing the cap against being pulled off of the bolt. After installation, the slight continuing deformation of the angled blades 2 will maintain a slight force tending to keep the bolt-covering cap 10 tight on the bolt. Also, if the bolt-covering cap 10 is pushed upon or shaken, the angled blades 2 will tend to flex and absorb the strain, maintaining a tight connection. If a turning force opposite the thread-handedness is applied to the installed bolt-covering cap 10, frictional contact with the bolt will tend to pull the angled blades 2 into a perpendicular orientation to the bolt, which will place increased force upon the bolt such that the junction would toggle but for the counteracting forces of the three angled blades 2 at 120-degree orientations. With the increased force toward the central axis, the bolt-covering cap 10 has an increased resistance to being turned. Therefore, any inadvertent application of a loosening force, such as might occur in cleaning around the bolt-covering cap 10, will be countered and the cap will remain securely attached. The increased resistance to being turned opposite the thread-handedness is not so great as to prevent intentional removal of the bolt-covering cap 10 when removal is desired.

Referring again to FIG. 8, a bolt-protecting embodiment 20 appropriate for protection of the threads of a bolt and protection of other objects from being damaged by the threads of a bolt works according to the same principles, providing a cover shell 1 and three angled blades 2, and providing the same self-threading and increased resistance to anti-thread-handedness turning.

Figure 9:
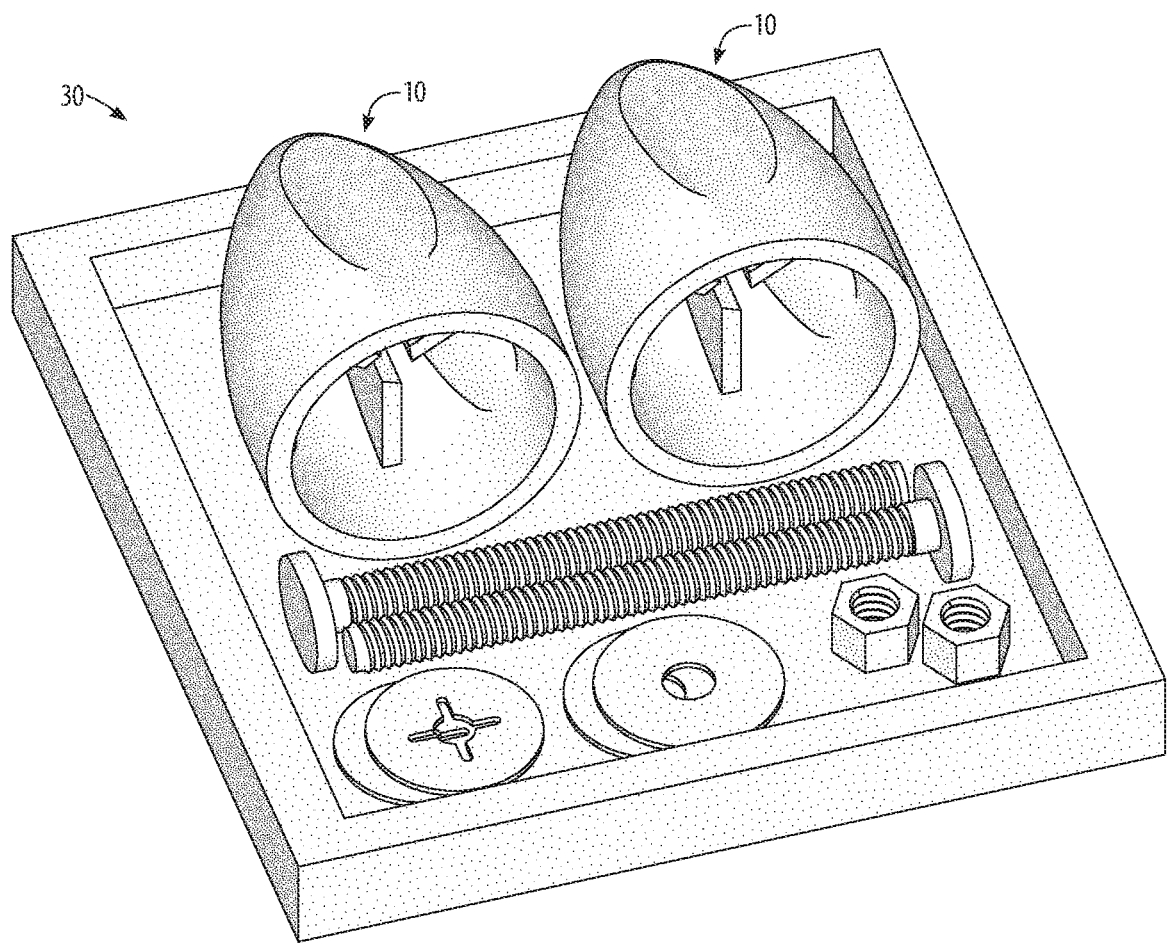
FIG. 9 is a schematic view of a toilet-mounting-kit embodiment of the bolt-covering cap of the invention.

Referring to FIG. 9, a kit embodiment 30 is provided, having two bolt-covering caps 10 and the flange bolts, nuts, washers, and retainers needed for installation, replacement, repair, or refitting of a toilet.

Many other changes and modifications can be made in the bolt-covering cap and kit of the present invention without departing from the spirit thereof. I therefore pray that my rights to the present invention be limited only by the scope of the appended claims.

I claim:

1. A bolt-covering cap for use with a bolt having a threaded portion having a bolt diameter and circumference, a thread-handedness, and a bolt length along an axial orientation, the bolt-covering cap comprising:
   (i) a cover shell defining an axial interior chamber of at least double the bolt diameter; and
   (ii) three angled blades mounted radially at 120-degree spacing to said cover shell axial interior chamber and running axially, defining a central axial void with a central axis, each angled blade having an angled face toward said central axis such that a leading edge in relation to the thread-handedness is at a greater distance from said central axis than a trailing edge, with the middle portion of said angled face located one-half of the bolt diameter from said central axis, said angled blades adapted to allow displacement by the bolt turning along the thread-handedness and to resist displacement by the bolt turning opposite the thread-handedness, and said angled faces adapted to allow deformation along said trailing edge conforming to the threads of the bolt;
   where, in use, when said bolt-covering cap is threaded onto the bolt in the direction of thread-handedness, the allowance of displacement by said angled blades orients said angled faces more tangential to the bolt circumference and allows turning with relatively smaller force, and when said bolt-covering cap is turned in a direction opposite thread-handedness, said angled faces become more perpendicular to the bolt circumference and resistance to displacement by said angled blades requires turning with relatively greater force; and
   where, in use, when said bolt-covering cap is threaded onto the bolt, deformation along said trailing edge forms, in effect, a self-threaded nut resistant to being pulled off of the bolt.

2. The bolt-covering cap of claim 1, where said cover shell further comprises exterior fluting.

3. The bolt-covering cap of claim 1, where said cover shell further comprises having a thickness of one-eighth inch.

4. The bolt-covering cap of claim 1, where said cover shell further comprises having a tapered shape.

5. The bolt-covering cap of claim 1, where said cover shell further comprises having an internal diameter of 1.25 inches at the open end.

6. The bolt-covering cap of claim 1, where said cover shell further comprises having a length of 2 inches.

7. The bolt-covering cap of claim 1, where said cover shell and said angled blades are made from PVC.

8. The bolt-covering cap of claim 1, where said cover shell and said angled blades are made from HDPE.

9. The bolt-covering cap of claim 1, where said angled face of said angled blades is at an angle of from 20 degrees to 30 degrees, inclusive.

10. The bolt-covering cap of claim 1, where said angled face of said angled blades is at an angle of 25 degrees.

11. A bolt-covering cap for use with a toilet flange bolt having a threaded portion having a bolt diameter and circumference, a thread-handedness, and a bolt length along an axial orientation, the bolt-covering cap comprising:
   (i) a cover shell defining an axial interior chamber of at least double the bolt diameter, having a tapered and fluted exterior surface; and
   (ii) three angled blades mounted radially at 120-degree spacing to said cover shell axial interior chamber and running axially, defining a central axial void with a central axis, each angled blade having an angled face toward said central axis such that a leading edge in relation to the thread-handedness is at a greater distance from said central axis than a trailing edge, with the middle portion of said angled face located one-half of the bolt diameter from said central axis, said angled blades adapted to allow displacement by the bolt turning along the thread-handedness and to resist displacement by the bolt turning opposite the thread-handedness, and said angled faces adapted to allow deformation along said trailing edge conforming to the threads of the bolt;
   where, in use, when said bolt-covering cap is threaded onto the bolt in the direction of thread-handedness, the allowance of displacement by said angled blades orients said angled faces more tangential to the bolt circumference and allows turning with relatively smaller force, and when said bolt-covering cap is turned in a direction opposite thread-handedness, said angled faces become more perpendicular to the bolt circumference and resistance to displacement by said angled blades requires turning with relatively greater force; and where, in use, when said bolt-covering cap is threaded onto the bolt, deformation along said trailing edge forms, in effect, a self-threaded nut resistant to being pulled off of the bolt.

12. The bolt-covering cap of claim 11, where said cover shell further comprises having a thickness of one-eighth inch.

13. The bolt-covering cap of claim 11, where said cover shell further comprises having an internal diameter of 1.25 inches at the open end.

14. The bolt-covering cap of claim 11, where said cover shell further comprises having a length of 2 inches.

15. The bolt-covering cap of claim 11, where said cover shell and said angled blades are made from PVC.

16. The bolt-covering cap of claim 11, where said cover shell and said angled blades are made from HDPE.

17. The bolt-covering cap of claim 11, where said angled face of said angled blades is at an angle of from 20 degrees to 30 degrees, inclusive.

18. The bolt-covering cap of claim 11, where said angled face of said angled blades is at an angle of 25 degrees.

19. A kit for installation of a toilet, comprising:
   (i) two bolt-covering caps for use with toilet flange bolts having a threaded portion having a bolt diameter and circumference, a thread-handedness, and a bolt length along an axial orientation, each bolt-covering cap comprising:
      (a) a cover shell defining an axial interior chamber of at least double the bolt diameter, having a tapered and fluted exterior surface; and
      (b) three angled blades mounted radially at 120-degree spacing to said cover shell axial interior chamber and running axially, defining a central axial void with a central axis, each angled blade having an angled face toward said central axis such that a leading edge in relation to the thread-handedness is at a greater distance from said central axis than a trailing edge, with the middle portion of said angled face located one-half of the bolt diameter from said central axis, said angled blades adapted to allow displacement by the bolt turning along the thread-handedness, and to resist displacement by the bolt turning opposite the thread-handedness, and said angled faces adapted to allow deformation along said trailing edge conforming to the threads of the bolt;
   where, in use, when said bolt-covering cap is threaded onto the bolt in the direction of thread-handedness, the allowance of displacement by said angled blades orients said angled faces more tangential to the bolt circumference and allows turning with relatively smaller force, and when said bolt-covering cap is turned in a direction opposite thread-handedness, said angled faces become more perpendicular to the bolt circumference and resistance to displacement by said angled blades requires turning with relatively greater force; and
   where, in use, when said bolt-covering cap is threaded onto the bolt, deformation along said trailing edge forms, in effect, a self-threaded nut resistant to being pulled off of the bolts; and
   (ii) flange bolts, nuts, washers, and retainers needed for installation, replacement, repair, or refitting of the toilet.

\* \* \* \* \*